(12) United States Patent
Wang et al.

(10) Patent No.: US 12,416,432 B2
(45) Date of Patent: Sep. 16, 2025

(54) MAGNETIC REFRIGERATION DEVICE

(71) Applicant: Gree Electric Appliances, Inc. of Zhuhai, Zhuhai (CN)

(72) Inventors: Kui Wang, Qianshan Zhuhai (CN); Sheng Luo, Qianshan Zhuhai (CN); Rong Yang, Qianshan Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 564 days.

(21) Appl. No.: 17/598,992

(22) PCT Filed: Dec. 16, 2019

(86) PCT No.: PCT/CN2019/125502
§ 371 (c)(1),
(2) Date: Sep. 28, 2021

(87) PCT Pub. No.: WO2020/224264
PCT Pub. Date: Nov. 12, 2020

(65) Prior Publication Data
US 2022/0170674 A1    Jun. 2, 2022

(30) Foreign Application Priority Data
May 9, 2019    (CN) .......................... 201910385657.7

(51) Int. Cl.
*F25B 21/00*    (2006.01)
(52) U.S. Cl.
CPC ...... *F25B 21/00* (2013.01); *F25B 2321/0023* (2013.01)

(58) Field of Classification Search
CPC .......................... F25B 21/00; F25B 2321/0023
See application file for complete search history.

(56) References Cited

U.S. PATENT DOCUMENTS

| | | | |
|---|---|---|---|
| 8,099,964 B2 * | 1/2012 | Saito ...................... | F25B 21/00 62/3.1 |
| 2012/0060512 A1 * | 3/2012 | Vetrovec ................ | F25B 21/00 62/3.1 |

(Continued)

FOREIGN PATENT DOCUMENTS

| | | |
|---|---|---|
| CN | 106373701 A | 2/2017 |
| CN | 107726664 A | 2/2018 |

(Continued)

OTHER PUBLICATIONS

CN-112413923-B mt (Year: 2021).*

(Continued)

*Primary Examiner* — Gordon A Jones
(74) *Attorney, Agent, or Firm* — Armstrong Teasdale LLP

(57) ABSTRACT

Provided is a magnetic refrigeration device, including a first assembly and a second assembly, herein the second assembly is an annular assembly, the first assembly is located on a radial outer side or a radial inner side of the second assembly, the first assembly is a first magnet assembly, the second assembly is provided with an air gap space capable of accommodating a magnetic working medium bed, the first assembly is configured to rotate relative to the second assembly, and directions of a magnetic line of force of the first magnet assembly are distributed in the circumferential direction of the annular second assembly.

17 Claims, 10 Drawing Sheets

(56) References Cited

U.S. PATENT DOCUMENTS

2015/0155748 A1  6/2015 Nord et al.
2015/0300704 A1* 10/2015 Benedict ................ F25B 21/00
                                                         62/3.1

FOREIGN PATENT DOCUMENTS

| CN | 109612151 A  | 4/2019  |
| CN | 109708335 A  | 5/2019  |
| CN | 209944795 U  | 1/2020  |
| EP | 2108904 A1   | 10/2009 |
| TW | I277108 B    | 3/2007  |
| WO | 03/016794 A1 | 2/2003  |

OTHER PUBLICATIONS

CN-218787638-U mt (Year: 2023).*
CN-214753201-U mt (Year: 2021).*
CN-103115454-A mt (Year: 2013).*
International search Report for corresponding PCT/CN2019/125502 mailed Mar. 18, 2020, 2 Pages.
Extended European Search Report for EP19927782.3 dated Jun. 1, 2022, 7 pages.
Search Report for CN2019103856577 dated Apr. 15, 2024, 2 pages.

* cited by examiner

MAGNETIC REFRIGERATION DEVICE

CROSS-REFERENCE TO RELATED APPLICATION

The present disclosure is a national stage application of International Patent Application No. PCT/CN2019/125502, which was filed on Dec. 16, 2019. The present disclosure claims priority to Chinese patent application No. 201910385657.7, filed on May 9, 2019 and titled "Magnetic refrigeration device", the disclosure of which are hereby incorporated by reference in their entirety.

TECHNICAL FIELD

The present disclosure belongs to a technical field of magnetic refrigeration, and particularly relates to a magnetic refrigeration device.

BACKGROUND

The present disclosure relates to the field of magnetic refrigeration, and mainly relates to a magnetic field generating device of a rotary-type magnetic refrigerator.

A magnetic refrigeration technology is a solid-state refrigeration mode based on the magnetocaloric effect. It uses environment friendly media such as water as heat transfer fluid, and has the characteristics of zero Global Warming Potential (GWP), zero Ozone Depression Potential (ODP), intrinsic high efficiency, low noise and low vibration and the like. In a room temperature range, the magnetic refrigeration has a broader application prospect than a low-temperature refrigeration field, such as applications in household refrigerators, air conditioners, medical and health services and other fields. Therefore, the research and development of the room temperature magnetic refrigeration technology in the past ten years are widely valued by countries all over the world, and some achievements are made in the world.

A magnetic refrigerator mainly includes five parts: a magnetic field system that generates a changing magnetic field, an active-type magnetic working medium bed (used to place a magnetocaloric material, and in some patents or documents, the magnetic working medium bed is also called a cold storage or regenerator), a cold-hot end heat exchanger, a heat exchange fluid circulation path and a matched power driving device. According to a working principle, the magnetic field system is divided into: an electromagnet, a permanent magnet and a superconducting magnet. In order to make the room temperature magnetic refrigeration practical and commercial, the permanent magnet is often used in an industry. Herein, permanent magnet magnetic refrigerators are divided into a rotary-type and a reciprocating-type according to a movement mode. Compared with the reciprocating-type magnetic refrigerator, the rotary-type is selected in order to improve the efficiency of the magnetic refrigerator. The rotary-type magnetic refrigerators are divided into a rotary magnet type and a rotary working medium bed type. Because the rotary working medium bed type magnetic refrigerator involves a dynamic sealing device made to solve the pipe winding and has mechanical friction loss and fluid leakage problems, therefore, the rotation of the magnetic field on the static magnetocaloric material (working medium bed) is a more effective solution scheme, so the permanent magnet rotary-type magnetic refrigerator is provided.

At present, the magnets used in the permanent magnet rotary-type magnetic refrigerator are developed from simple parallelly arranged magnets, "C"-type magnets, and 2D simple rotary-type magnets to complex magnets designed mainly using magnetism gathering ideas such as the "Halbach rotation theorem" and the law of magnetic circuit, and mainly divided into: "C" type and Halbach (2D) hybrid type, rotary-type double or multilayer Halbach (2D), and permanent magnet array Halbach (3D).

Herein, while a "C" type and Halbach (2D) hybrid type magnet system is used in the rotary-type magnetic refrigerator, there are problems such as a large rotational inertia because the entire magnet needs to be rotated, and insufficient expansion of an air gap volume because the height of a C-type air gap is limited so that a radial expansion of the air gap is insufficient. Double Halbach magnet arrays and triple Halbach (2D) arrays have the limitation of the smaller air gap volume in a center hole. The magnetic path may be approximated as a two-dimensional way, and the three-dimensional guidance of the magnetic path may lead to the increase of the magnetic flux density in the needed directions, such as the permanent magnet array Halbach (3D). However, in most cases, the complexity of this magnetic path makes assembly difficult and costly, and it is not beneficial to commercialization.

Since the magnetic refrigeration device known to the inventor adopts a distribution mode of a magnetic line of force for magnetizing by using a radial direction or a magnetic field direction radially combined with other directions, the radial air gap size is limited, the air gap volume is smaller, the magnetic working medium has a smaller accommodating volume, and the refrigeration or heating performance of the magnetic refrigeration device is lower, so the refrigeration or heating performance is affected. In addition, there are technical problems such as low magnetic field strength. Therefore, some embodiments of the present disclosure research and design a magnetic refrigeration device.

SUMMARY

Therefore, the technical problem to be solved by some embodiments of the present disclosure is to overcome the disadvantages known to the inventor that the radial air gap size of the magnetic refrigeration device is limited and the air gap accommodating volume of a magnetic working medium is smaller so that the refrigeration or heating performance of the magnetic refrigeration device is lower, thereby a magnetic refrigeration device is provided.

Some embodiments of the present disclosure provide a magnetic refrigeration device, which includes a first assembly and a second assembly. The second assembly is an annular assembly, the first assembly is located on a radial outer side or a radial inner side of the second assembly, the first assembly is a first magnet assembly, the second assembly is provided with an air gap space capable of accommodating a magnetic working medium bed, the first assembly is configured to rotate relative to the second assembly, and directions of a magnetic line of force of the first magnet assembly are distributed in a circumferential direction of the annular second assembly.

In some embodiments, the second assembly is also a second magnet assembly, and directions of a magnetic line of force of the second assembly are also distributed along the circumferential direction of the annular second assembly.

In some embodiments, magnetic lines of force of the second magnet assembly are serially connected to form a closed loop.

In some embodiments, the first assembly includes an outer magnet assembly located on the radial outer side of the second assembly and an inner magnet assembly located on the radial inner side of the second assembly.

In some embodiments, the outer magnet assembly and the inner magnet assembly correspond to each other and occupy a same angle in the circumferential direction.

In some embodiments, the outer magnet assembly includes a first unit and a second unit that are separated, and a magnetic line of force of the first unit and a magnetic line of force of the second unit are serially connected through the second assembly to form a closed loop of the magnetic lines of force.

In some embodiments, the inner magnet assembly includes a third unit and a fourth unit that are separated, and a magnetic line of force of the third unit and a magnetic line of force of the fourth unit are serially connected through the second assembly to form a closed loop of the magnetic lines of force.

In some embodiments, while the outer magnet assembly includes a first unit and a second unit that are separated, the first unit and the second unit are connected by a non-magnetic outer connecting piece.

Or, while the inner magnet assembly includes the third unit and the fourth unit that are separated, the third unit and the fourth unit are connected by a non-magnetic inner connecting piece.

Or, while the outer magnet assembly includes the first unit and the second unit that are separated, the first unit and the second unit are connected by a non-magnetic outer connecting piece. While the inner magnet assembly includes the third unit and the fourth unit that are separated, the third unit and the fourth unit are connected by a non-magnetic inner connecting piece.

In some embodiments, while the second assembly is also the second magnet assembly, directions of magnetic lines of force of the second assembly, directions of magnetic lines of force of the inner magnet assembly and directions of magnetic lines of force of the outer magnet assembly are all in a same surrounding direction.

In some embodiments, the outer magnet assembly further includes at least one first outer permanent magnet, at least one first outer soft magnet, and the first outer soft magnet is arranged between two adjacent first outer permanent magnets.

In some embodiments, an edge of the first outer permanent magnet is also connected and provided with an outer end permanent magnet, and directions of magnetic lines of force of the outer end permanent magnet point to the magnetic working medium bed or directions of extension lines of magnetic lines of force of the outer end permanent magnet pass through the magnetic working medium bed.

In some embodiments, the inner magnet assembly further includes at least one first inner permanent magnet and at least one first inner soft magnet, and the first inner soft magnet is arranged between two adjacent first inner permanent magnets.

In some embodiments, an edge of the first inner permanent magnet is also connected and provided with an inner end permanent magnet, and directions of magnetic lines of force of the inner end permanent magnet point to the magnetic working medium bed or directions of extension lines of the magnetic lines of force of the outer end permanent magnet pass through the magnetic working medium bed.

In some embodiments, the second assembly further includes a second permanent magnet and a second soft magnet, the second soft magnet is arranged between two adjacent second permanent magnets, a pole shoe is also arranged between the second permanent magnet and the magnetic working medium bed, and the pole shoe is made of a soft magnetic material.

In some embodiments, the second assembly further includes a second permanent magnet and a second soft magnet, and the second permanent magnet is arranged between two adjacent second soft magnets, a pole shoe is also arranged between the second soft magnet and the magnetic working medium bed, and the pole shoe is made of a soft magnetic material.

In some embodiments, the pole shoe and the second soft magnet are an integrally formed structure.

In some embodiments, there are more than two magnetic working medium beds, the air gap space is a magnetic gap, and more than one magnetic working medium bed is placed in one magnetic gap.

In some embodiments, there are 4 magnetic working medium beds and 4 magnetic gaps. Or there are 6 magnetic working medium beds and 6 magnetic gaps.

The magnetic refrigeration device provided by some embodiments of the present disclosure has the following beneficial effects.

1. In the present disclosure, through the mode that the magnetic working medium bed is arranged on the annular second assembly, the first assembly is arranged on the radial inner side or outer side of the second assembly, the first assembly is a magnet assembly that generates a magnetic field, and the first assembly is rotated relative to the second assembly, an alternating magnetic field is generated to the magnetic working medium bed on the second assembly, thereby the magnetic working medium in the magnetic working medium bed is driven to produce a magnetized or demagnetized process, so that an effect of external heat absorption or heat release is produced, and the effect of magnetic refrigeration or magnetic heating is achieved. In addition, directions of the magnetic lines of force of the first magnet assembly are distributed along a circumferential direction of the annular second assembly, it effectively prevents and avoids the disadvantages in a mode that the directions of the magnetic lines of force are along the radial direction or the radial direction in combination with other directions, the size of the magnetic working medium bed along the radial direction may not be too large, otherwise the magnetic attenuation may be caused to affect the magnetic field strength, so that a size of the radial air gap is limited, an air gap accommodating volume of the magnetic working medium is smaller, and the refrigeration or heating performance of the magnetic refrigeration device is lower. So the radial size (especially a part including the magnetic working medium bed) of the second assembly is set to be larger, the air gap accommodating volume of the magnetic working medium bed is increased, the amount of the magnetic working medium or the actual effective working space of the magnet is increased, the refrigeration or heating effect of the magnetic refrigeration device is improved, and the refrigeration or heating performance of the magnetic refrigeration device is improved.

2. In addition, some embodiments of the present disclosure effectively improve the magnetic field strength of the magnetic refrigeration device through either a closed magnetic circuit formed by the series connection of the second magnet assembly or a closed magnetic circuit formed by the series connection of the first magnet assembly. In addition, the parallel effect of the magnetic circuit is further effectively formed through the accumulation and superposition of a plurality of circumferential ring magnetic circuits in a strong magnetic area, the magnetic field strength of the magnetic refrigeration device is further effectively enhanced, and the refrigeration or heating effect of the magnetic refrigeration device is improved.

3. In some embodiments of the present disclosure, through arranging a multi-layer basic magnetic circuit formed by the first magnet assembly and the second magnet assembly, the magnetic field is converged in a plurality of strong magnetic areas and avoid a plurality of weak magnetic areas, and the areas avoided by the magnetic circuit form the weak magnetic areas, thereby the demagnetization effect of the magnetic working medium placed in it is achieved. In addition, through a plurality of magnet blocks, there is a plurality of magnetic gaps, the periodic magnetization and demagnetization of a plurality of the magnetic working medium beds is achieved at a higher frequency, so the problem that the frequency of magnetization and demagnetization is lower is solved.

4. In some embodiments of the present disclosure, through the arrangement of the end permanent magnet, the magnetic field guidance of the magnetized area, namely the strong magnetic area, may also be achieved, so that the magnetic lines of force are converged in the strong magnetic areas, thereby it is achieved that the directions of the magnetic lines of force enter the strong magnetic area and then leave the strong magnetic area after being converged. In this way, the magnetic field strength of the strong magnetic area is enhanced. Through arranging the soft magnetic or the pole shoe of the soft magnetic material, the magnetic field is short-circuited and guided, thereby it has the better magnetic shielding and demagnetization effects on the demagnetized magnetic working medium bed, and has the good magnetic flux effect on the demagnetized magnetic working medium bed, so the magnetic field distribution is uniform.

Figure 1:
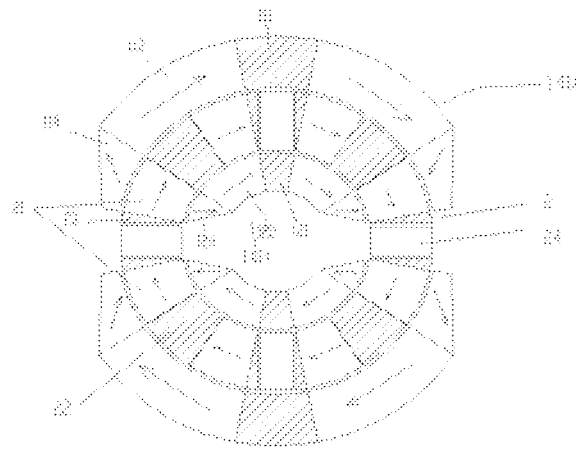
FIG. 1 illustrates a top view of the first implementation mode of the magnetic refrigeration device of the present disclosure.

Reference signs in drawings are represented as:
1. First assembly, 11. Outer magnet assembly, 11a. First unit, 11b. Second unit, 110. Outer end permanent magnet, 111. First outer soft magnet, 112. First outer permanent magnet, 114. Non-magnetic outer connecting piece, 12. Inner magnet assembly, 12a. Third unit, 12b. Fourth unit, 120. Inner end permanent magnet, 121. First inner soft magnet, 122. First inner permanent magnet, 124. Non-magnetic inner connecting piece, 2. Second assembly, 21. Second permanent magnet, 22. Second soft magnet, 23. Pole shoe, and 24. Magnetic working medium bed.

DETAILED DESCRIPTION OF THE EMBODIMENTS

In order to understand the present disclosure conveniently, the present disclosure is more comprehensively described below with reference to relevant drawings. The drawings show some embodiments of the present disclosure. However, the present disclosure may be implemented in many different forms and is not limited to the embodiments described herein. On the contrary, the purpose of providing these embodiments is to make the understanding of the content disclosed by the present disclosure more thorough and comprehensive.

As shown in FIG. 1-19, the present disclosure provides a magnetic refrigeration device, it includes a first assembly 1 and a second assembly 2.

The second assembly 2 is an annular assembly, the first assembly 1 is located on a radial outer side or a radial inner side of the second assembly 2, the first assembly 1 is a first magnet assembly, the second assembly 2 is provided with an air gap space capable of accommodating a magnetic working medium bed 24, the first assembly 1 is configured to rotate relative to the second assembly 2, and directions of magnetic lines of force of the first magnet assembly are distributed in a circumferential direction of the annular second assembly 2.

In the present disclosure, through the mode that the magnetic working medium bed is arranged on the ring-shaped second assembly, the first assembly is arranged on the radial inner side or outer side of the second assembly, the first assembly is the magnet assembly that generates a magnetic field, and the first assembly is rotated relative to the second assembly, an alternating magnetic field is generated to the magnetic working medium bed on the second assembly, thereby a magnetic working medium in the magnetic working medium bed is driven to produce a magnetized or demagnetized process, so that an effect of external heat absorption or heat release is produced, and an effect of magnetic refrigeration or magnetic heating is achieved. In addition, the directions of the magnetic lines of force of the first magnet assembly are distributed along the circumferential direction of the annular second assembly, it effectively prevents and avoids disadvantages in a mode that the directions of the magnetic lines of force are along a radial direction or a radial direction in combination with other directions, the size of the magnetic working medium bed along the radial direction may not be too large, otherwise the magnetic attenuation may be caused to affect the magnetic field strength, so that the size of the radial air gap is limited, an air gap accommodating volume of the magnetic working medium is smaller, and the refrigeration or heating performance of the magnetic refrigeration device is lower. So the radial size (especially a part including the magnetic working medium bed, because the magnetic lines of force in an art known to inventors are distributed along the radial direction, if the radial size is enlarged, the magnetic field is seriously attenuated) of the second assembly is set to be larger, the air gap accommodating volume of the magnetic working medium bed is increased, the amount of the magnetic working medium or an actual effective working space of the magnet is increased, the refrigeration or heating effect of the magnetic refrigeration device is improved, and the refrigeration or heating performance of the magnetic refrigeration device is improved.

In some embodiments, the second assembly 2 is also a second magnet assembly, and the directions of the magnetic lines of force of the second assembly are also distributed along the circumferential direction of the annular second assembly 2. The directions of the magnetic lines of force of the second magnet assembly are distributed along the circumferential direction of the annular second assembly, it effectively prevents and avoids disadvantages in a mode that the directions of the magnetic lines of force are along a radial direction or a radial direction in combination with other directions, a size of the magnetic working medium bed along the radial direction may not be too large, otherwise the magnetic attenuation may be caused to affect a magnetic field strength, so that a size of a radial air gap is limited, an air gap accommodating volume of the magnetic working medium is smaller, and the refrigeration or heating performance of the magnetic refrigeration device is lower. So the radial size (especially a part including the magnetic working medium bed, because magnetic lines of force in an art known to inventors are distributed along the radial direction, if the radial size is enlarged, the magnetic field may be seriously attenuated) of the second assembly is set to be larger, the air gap accommodating volume of the magnetic working medium bed is increased, the amount of the magnetic working medium or an actual effective working space of the magnet is increased, the refrigeration or heating effect of the magnetic refrigeration device is improved, and the refrigeration or heating performance of the magnetic refrigeration device is improved.

First Implementation Mode

As shown in FIGS. 1 to 7, the first implementation mode is described. A magnet constituted by the first implementation mode has 4 magnetic gaps (namely, an air gap space), and a basic principle of a magnetic circuit thereof may refer to FIG. 14.

Figure 2:
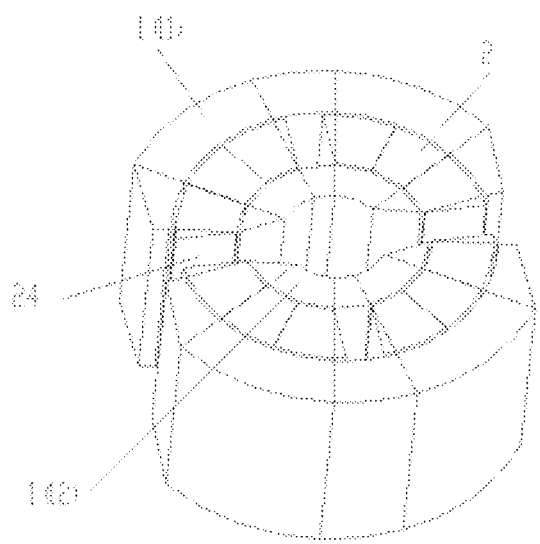
FIG. 2 illustrates a three-dimensional schematic diagram of the first implementation mode of the magnetic refrigeration device of the present disclosure.

As shown in FIG. 1, a magnetic field system is composed of two magnet assemblies of the first assembly 1 and the second assembly 2. The first assembly 1 is composed of 2 first magnet assembly units, and the 2 first magnet assembly units are evenly arranged at 360° in some embodiments. FIG. 2 is a three-dimensional schematic diagram of the first implementation mode. It may be seen that there are 4 magnetic gaps for placing the magnetic working medium bed 24.

In some embodiments, the magnetic lines of force of the second magnet assembly are connected in series to form a closed loop. The closed magnetic circuit formed by the series connection of the second magnet assembly effectively increases a magnetic field strength of the magnetic refrigeration device.

In some embodiments, the first assembly 1 includes an outer magnet assembly 11 located on the radial outer side of the second assembly 2 and an inner magnet assembly 12 located on the radial inner side of the second assembly 2. The formed multi-layer basic magnetic circuit enables the magnetic field to be converged in a plurality of strong magnetic areas and avoid a plurality of weak magnetic areas. The areas avoided by the magnetic circuit form the weak magnetic areas, thereby the demagnetization effect of the magnetic working medium placed in it is achieved, and the areas in which the magnetic circuits are converged form the strong magnetic areas, thereby the magnetization effect of the magnetic working medium placed in it is achieved. In addition, a parallel effect of the magnetic circuits is further effectively formed through gathering and superposing a plurality of circumferential annular magnetic circuits in the strong magnetic areas, the magnetic field strength of the magnetic refrigeration device is further effectively enhanced, and the refrigeration or heating effect of the magnetic refrigeration device is improved.

In some embodiments, the outer magnet assembly and the inner magnet assembly correspond to each other, and angles occupied in the circumferential direction are substantially the same or overlapped, namely, the inner magnet assembly and the corresponding outer magnet assembly are separated into units at the magnetic gap.

In some embodiments, the outer magnet assembly 11 includes a first unit 11a and a second unit 11b that are separated, and the magnetic line of force of the first unit 11a and the magnetic line of force of the second unit 11b are serially connected through the second assembly 2 to form a closed loop of the magnetic lines of force. Since the outer magnet assembly is separated from the first unit and the second unit, it is connected to the second assembly at the separated position, and the magnetic lines of force of the first unit and the second unit are connected in series through the second assembly to form a closed magnetic circuit, so the magnetic field strength of the magnetic refrigeration device is further effectively improved.

In some embodiments, the inner magnet assembly 12 includes a third unit 12a and a fourth unit 12b that are separated, and the magnetic line of force of the third unit 12a and the magnetic line of force of the fourth unit 12b are serially connected through the second assembly 2 to form a closed loop of the magnetic lines of force. Since the inner magnet assembly is separated from the third and fourth units, it is connected to the second assembly at the separated position, the magnetic lines of force of the third unit and the fourth unit are serially connected through the second assembly to form a closed magnetic circuit, so the magnetic field strength of the magnetic refrigeration device is further effectively improved.

In some embodiments, while the outer magnet assembly 11 includes the first unit 11a and the second unit 11b that are separated, the first unit and the second unit are connected by a non-magnetic outer connecting piece 114.

Or, while the inner magnet assembly 12 includes the third unit 12a and the fourth unit 12b that are separated, the third unit and the fourth unit are connected by a non-magnetic inner connecting piece 124.

Or, while the outer magnet assembly 11 includes the first unit 11a and the second unit 11b that are separated, the first unit and the second unit are connected by a non-magnetic outer connecting piece 114. While the inner magnet assembly 12 includes the third unit 12a and the fourth unit 12b that are separated, the third unit and the fourth unit are connected by a non-magnetic inner connecting piece 124.

The first unit and the second unit are connected together through the non-magnetic outer connecting piece, but it is not magnetic-conductive. The connecting piece is usually made of magnetic-less or non-magnetic plastic, aluminum alloy and other materials, through the non-magnetic inner connecting piece, the third unit and the fourth unit are connected together, but it is not magnetic-conductive.

In some embodiments, while the second assembly 2 is also the second magnet assembly, directions of the magnetic lines of force of the second assembly 2, directions of the magnetic lines of force of the inner magnet assembly 12 and directions of the magnetic lines of force of the outer magnet assembly 11 are all in the same surrounding direction. In this way, the directions of the magnetic lines of force of the inner magnet assembly, the directions of the magnetic lines of force of the outer magnet assembly and the directions of the magnetic lines of force of the second magnet assembly are extended in the same direction, thereby a plurality of parallel magnetic lines of force is formed, the strength of the magnetic field is effectively enhanced, and the refrigeration and heating capacity of the magnetic refrigeration device is improved.

In some embodiments, the outer magnet assembly 11 further includes at least one first outer permanent magnet 112, at least one first outer soft magnet 111, and there are multiple first outer permanent magnets 112, each first outer soft magnet 111 is arranged between two adjacent first outer permanent magnets. This is a structural form of the outer magnet assembly of the present disclosure. Through a mode of the combination of the first outer permanent magnet and the first outer soft magnet, by arranging the soft magnet or the pole shoe of the soft magnetic material, the magnetic field is short-circuited and guided, thereby it has a better magnetic shielding and demagnetization effects on the demagnetized magnetic working medium bed, and may also provide a good magnetic flux effect on the magnetized magnetic working medium bed, so that the magnetic field distribution is uniform, and the cost of the soft magnet is lower.

Figure 3:
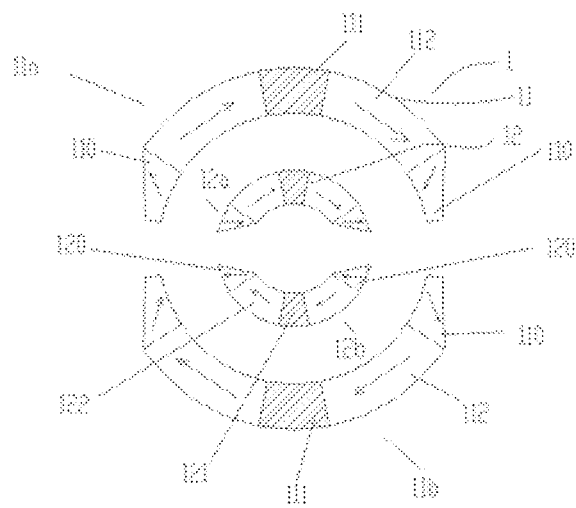
FIG. 3 illustrates a structure schematic diagram of a first magnet assembly in the first implementation mode of the magnetic refrigeration device of the present disclosure.

FIG. 3 shows the first assembly 1. The first assembly 1 includes the outer magnet assembly 11 and the inner magnet assembly 12, herein the inner magnet assembly 12 and the outer magnet assembly 11 are relatively fixed in position. In some embodiments, the inner magnet assembly 12 is composed of a permanent magnet material and a soft magnetic material, and the outer magnet assembly 11 is also composed of the permanent magnet material and the soft magnetic material. Herein, the permanent magnet material forms a magnetic field in a certain direction, it is a source of the magnetic field and is also indispensable. The use of the lower-cost soft magnetic material instead of some permanent magnetic materials reduces the cost. In addition, in a part close to the magnetic working medium bed 24 of the demagnetization area, the use of the soft magnetic material with the better magnetic conductive effect may form a magnetic shield, thereby it has the better demagnetization effect on the demagnetized magnetic working medium bed 24. As shown in FIGS. 1 and 3, arrows represent the permanent magnetic materials, the directions of the arrows indicate the directions of magnetization, and shaded parts are the soft magnetic material. Herein, the permanent magnetic material includes but is not limited to neodymium iron boron, and the soft magnetic material may be electrical pure iron, low carbon steel and the like.

Figure 5:
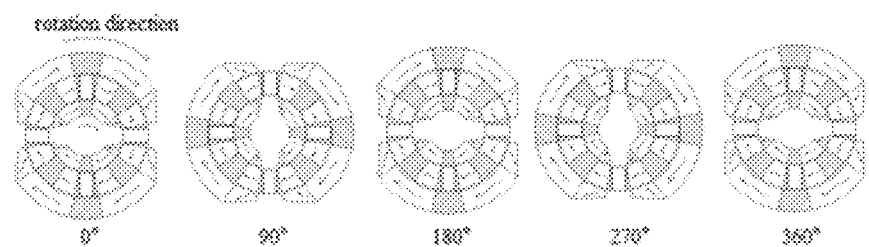
FIG. 5 illustrates a schematic diagram of the 360° rotation of the first magnet assembly in a working period of the first implementation mode of the magnetic refrigeration device of the present disclosure.

In some embodiments, an edge of the first outer permanent magnet 112 is also connected with an outer end permanent magnet 110, and directions of the magnetic lines of force of the outer end permanent magnet 110 point to the magnetic working medium bed 24 or directions of extension lines of the magnetic lines of force pass through the magnetic working medium bed 24. Through the arrangement of the end permanent magnet, a magnetic field guidance in a magnetized area, namely the strong magnetic area, is achieved, so that the magnetic lines of force are converged in the strong magnetic area (namely, a position in which the magnetic working medium bed is magnetized, as shown in FIG. 5, positions of left and right two magnetic working medium beds at 0 degrees), thereby it is achieved that the directions of the magnetic lines of force enter the strong magnetic areas and then leave the strong magnetic areas after being converged. In this way, the magnetic field strength of the strong magnetic areas is strengthened.

In some embodiments, the outer magnet assembly 11 includes an outer end permanent magnet 110, a first outer permanent magnet 112, and a first outer soft magnet 111. The first outer soft magnet 111 is arranged between the two outer permanent magnets, and two ends of the two outer permanent magnets are respectively provided with the outer end permanent magnets 110. Similarly, the inner magnet assembly 12 includes two first inner permanent magnets 122, a first inner soft magnet 121 located between them, and two inner end permanent magnets 120 located at both ends of the two first inner permanent magnets 122. Herein, the main function of the inner and outer end permanent magnets is to achieve the magnetic field guidance of the magnetized area, namely the strong magnetic area, so that the magnetic lines of force are converged in the strong magnetic area, herein some of the magnetizing directions point to the strong magnetic area, and some of the magnetizing directions leave from the strong magnetic area, so that it is achieved that the directions of the magnetic lines of force enter the strong magnetic area and then leave the strong magnetic area after being converged. In this way, the magnetic field strength of the strong magnetic area is strengthened. The magnetization directions of the permanent magnets in the inner and outer magnet assemblies are the same, so that the formed inner and outer magnetic circuits are kept in the same clockwise direction or the same counterclockwise direction, thereby a magnetic circuit direction of the first magnet assembly unit is constituted, the magnetic circuit direction of each first magnet assembly unit is also kept in the same clockwise direction or the same counterclockwise direction, so that the two first magnet assembly units form an important constituent part of an annular magnetic circuit in the clockwise or counterclockwise direction.

In some embodiments, the inner magnet assembly 12 further includes at least one first inner permanent magnet 122 and at least one first inner soft magnet 121, and when there are multiple first inner permanent magnets 122, the first inner soft magnet 121 is arranged between two adjacent first inner permanent magnets 122. This is a structural form of the inner magnet assembly of the present disclosure. Through a mode of the combination of the first inner permanent magnet and the first inner soft magnet, by arranging the soft magnet or the pole shoe of the soft magnetic material, the magnetic field may be short-circuited and guided, thereby it has the better magnetic shielding and demagnetization effects on the demagnetized magnetic working medium bed, and may also provide the good magnetic flux effect on the magnetized magnetic working medium bed, so that the magnetic field distribution is uniform, and the cost of the soft magnet is lower.

In some embodiments, an edge of the first inner permanent magnet 122 is also connected and provided with an inner end permanent magnet 120, and directions of magnetic lines of force of the inner end permanent magnet 120 point to the magnetic working medium bed 24 or directions of extension lines of the magnetic lines of force pass through the magnetic working medium bed 24. Through the arrangement of the end permanent magnet, the magnetic field guidance in the magnetized area, namely the strong magnetic area, is achieved, so that the magnetic lines of force are converged in the strong magnetic area (namely, a position in which the magnetic working medium bed is magnetized, as shown in FIG. 5, the positions of left and right two magnetic working medium beds at 0 degrees), thereby it is achieved that the directions of the magnetic lines of force enter the strong magnetic areas and then leave the strong magnetic areas after being converged. In this way, the magnetic field strength of the strong magnetic areas is strengthened.

In some embodiments, the second assembly 2 further includes a second permanent magnet 21 and a second soft magnet 22, the second soft magnet 22 is arranged between two adjacent second permanent magnets 21, a pole shoe is also arranged between each second permanent magnet 21 and a corresponding magnetic working medium bed 24, and the pole shoe is made of a soft magnetic material. This is a structural form of the second magnet assembly of the present disclosure (first and second implementation modes, refer to FIG. 1-9). Through a mode of the combination of the second permanent magnet and the second soft magnet, by arranging the soft magnet or the pole shoe of the soft magnetic material, the magnetic field may be short-circuited and guided, thereby it has the better magnetic shielding and demagnetization effects on the demagnetized magnetic working medium bed, and may also provide the good magnetic flux effect on the magnetized magnetic working medium bed, so that the magnetic field distribution is uniform, and the cost of the soft magnet is lower.

In some embodiments, the second assembly 2 further includes a second permanent magnet 21 and a second soft magnet 22, and the second permanent magnet 21 is arranged between two adjacent second soft magnets 22, a pole shoe 23 is also arranged between the second soft magnet 22 and the magnetic working medium bed 24, and the pole shoe 23 is made of a soft magnetic material. This is a structural form of the second magnet assembly of the present disclosure (third implementation mode, refer to FIG. 10-11), through a mode of the combination of the second permanent magnet and the second soft magnet, by arranging the soft magnet or the pole shoe of the soft magnetic material, the magnetic field may be short-circuited and guided, thereby it has the better magnetic shielding and demagnetization effects on the demagnetized magnetic working medium bed, and may also provide the good magnetic flux effect on the magnetized magnetic working medium bed, so that the magnetic field distribution is uniform, and the cost of the soft magnet is lower. In some embodiments, the pole shoe 23 and the second soft magnet 22 are an integrally formed structure.

Figure 4:
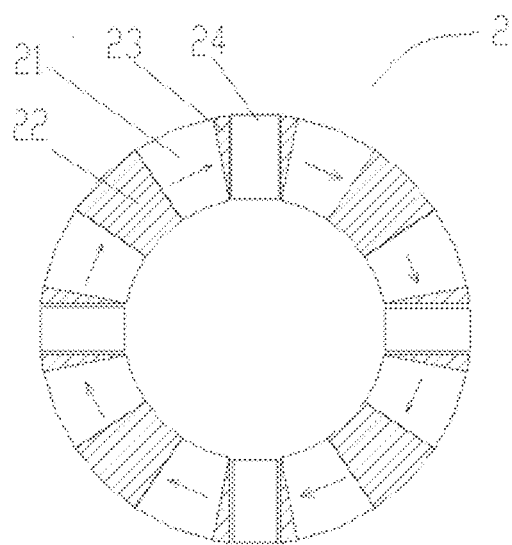
FIG. 4 illustrates a structure schematic diagram of a second magnet assembly in the first implementation mode of the magnetic refrigeration device of the present disclosure.

FIG. 4 shows the second assembly 2. In some embodiments, the second assembly 2 is composed of 4 second magnet assembly units, and the 4 second magnet assembly units are arranged evenly at 360°. In some embodiments, the second magnet assembly unit includes a second permanent magnet 21 and a second soft magnet 22, and two ends of the second magnet assembly unit are provided with the pole shoes 23 made of the soft magnetic material. As shown in FIG. 4, each second magnet assembly unit includes two permanent magnets, a second soft magnet 22 located between them and pole shoes 23 at both ends thereof.

The magnetizing direction of the second permanent magnets 21 in the second magnet assembly unit is kept in the same clockwise or counterclockwise direction, thereby the magnetic circuit direction of the second magnet assembly unit is formed, and the magnetic circuit direction of each second magnet assembly unit is kept in the same clockwise or counterclockwise direction, so that 4 second magnet assembly units form an important constituent part of the annular magnetic circuit in the clockwise or counterclockwise direction. The 4 second magnet assemblies form 4 gaps between each other, so the gaps constitute air gap volumes, and one magnetic working medium bed 24 is arranged in each air gap volume. While the second assembly 2 is rotated, the magnetic working medium bed 24 is rotated synchronously with it. While the second magnet assembly is fixed, the magnetic working medium bed 24 is also fixed, namely a relative position of the magnetic working medium bed 24 and the second assembly 2 remains unchanged.

The first assembly 1 and the second assembly 2 are coaxially arranged, and the size of the second assembly 2 satisfies that its rotational movement area is located between rotational movement areas of the outer magnet assembly 11 and the inner magnet assembly 12 in the first assembly 1. A direction of an annular magnetic circuit formed by the first magnet assembly unit and a direction of an annular magnetic circuit formed by the second magnet assembly remain the same clockwise or counterclockwise, thereby the superposition of the magnetic circuits is formed. There are three ways of the rotation. The first assembly 1 is fixed, and the second assembly 2 is rotated. The first assembly 1 is rotated, and the second assembly 2 is fixed. Both assemblies are rotated but at different speeds. That is to say, it only needs to form the relative rotational movement of the first magnet assembly and the second magnet assembly.

While the first assembly 1 and the second assembly 2 are rotated relative to each other, 4 magnetic working medium beds 24 are magnetized and demagnetized correspondingly during a certain period of time. While the 2 magnetic working medium beds 24 are in the magnetized state, the other 2 magnetic working medium beds 24 are in the demagnetized state, and the states of the adjacent magnetic working medium beds 24 are opposite. FIG. 5 is a schematic diagram in the case that the second assembly 2 is fixed and the first assembly 1 is rotated while the first assembly 1 is rotated by 360°. It may be seen from FIG. 5 that every time the first assembly 1 is rotated by 90°, the conversion of the magnetization and demagnetization of the magnetic working medium bed 24 is completed, namely two of the magnetic working medium beds are changed from the magnetized state to the demagnetized state, and the other two magnetic working medium beds are changed from the demagnetized state to the magnetized state. The rotation of 360° realizes 4 times of the magnetization and demagnetization conversion of the 4 magnetic working medium beds 24. For example, an initial state is the demagnetized state. For a single magnetic working medium bed, a rotor is rotated by 360° to achieve the following process: demagnetization→magnetization-→demagnetization→magnetization→demagnetization. It may be seen that 4 times of the magnetization and demagnetization conversion are achieved, and it is the same for the other three magnetic working medium beds, so while the rotor is rotated by every 360°, 4 times of the magnetization and demagnetization conversion of 4 magnetic working medium beds are achieved.

In some embodiments, there are more than two magnetic working medium beds 24, the air gap space is a magnetic gap, and more than one magnetic working medium bed 24 may be placed in one magnetic gap. Some embodiments of the present disclosure realize periodic magnetization and demagnetization of a plurality of magnetic gap magnetic working medium beds at a higher frequency through a plurality of magnetic gaps (namely, the air gaps that accommodate the magnetic working medium beds), so the problem that the frequency magnetization and demagnetization is lower is solved.

In some embodiments, there are 4 magnetic working medium beds and 4 magnetic gaps. Or there are 6 magnetic working medium beds and 6 magnetic gaps. These are structural forms of the first to fourth implementation modes and the fifth implementation mode of the present disclosure.

Figure 6:
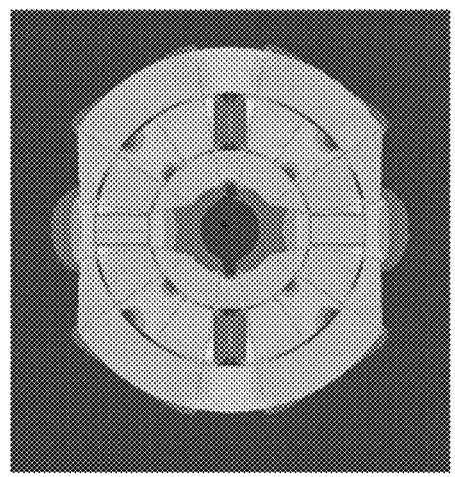
FIG. 6 illustrates a magnetic field cloud diagram generated by the first implementation mode of the magnetic refrigeration device of the present disclosure.
Figure 7:
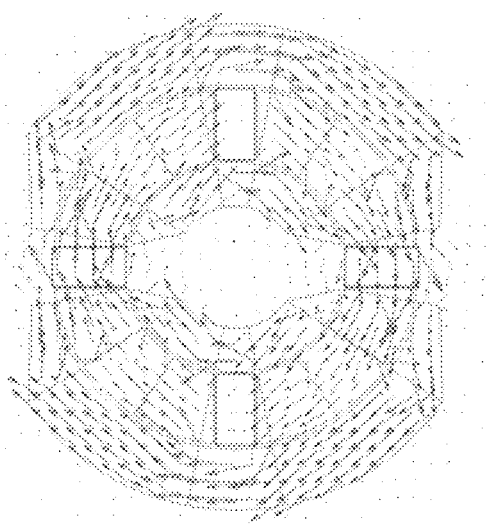
FIG. 7 illustrates a vector diagram of a magnetic induction intensity of the first implementation mode of the magnetic refrigeration device of the present disclosure.

FIG. 6 and FIG. 7 illustrate respectively magnetic field cloud diagram and vector diagram of the magnetic induction intensity generated by the first implementation mode. In FIG. 6, the gradation of colors indicates the strength of the magnetic field, the darker color indicates the weaker magnetic field strength, and the lighter color indicates the stronger magnetic field strength. It may be seen that in this state, an area in which the upper and lower two magnetic working medium beds 24 are located is in the weak magnetic field strength and in the demagnetized state, and an area in which the left and right two magnetic working medium beds 24 are located is in the strong magnetic field strength and in the magnetized state. The arrow direction in FIG. 7 represents the vector direction of the magnetic induction intensity. It may be seen that an entire annular magnetic circuits are converged in the clockwise direction in the area in which the left and right magnetic working medium beds 24 are located. The density of the arrows is higher, and the magnetization is achieved. There are almost no arrows in the areas of the upper and lower two magnetic working medium beds 24, a weak magnetic field is achieved.

Herein, the magnetic working medium bed 24 and the second assembly 2 may be connected as a whole or may be separated.

The magnetic field system formed by the method has a cylindrical shape, and its cross-section may be circular, rectangular, annular or other shapes. The cross-sectional shape of the air gap includes but is not limited to a rectangle, and a cross-section, determined by the shape of the air gap, of the magnetic working medium bed includes but is not limited to a rectangle. The magnetic field system formed by the method includes a plurality of air gap areas, and each air gap area is used to place the magnetic working medium bed. The volume of the air gap are may be realized by changing a columnar length or an axial height of the magnetic field system.

Second Implementation Mode

Figure 8:
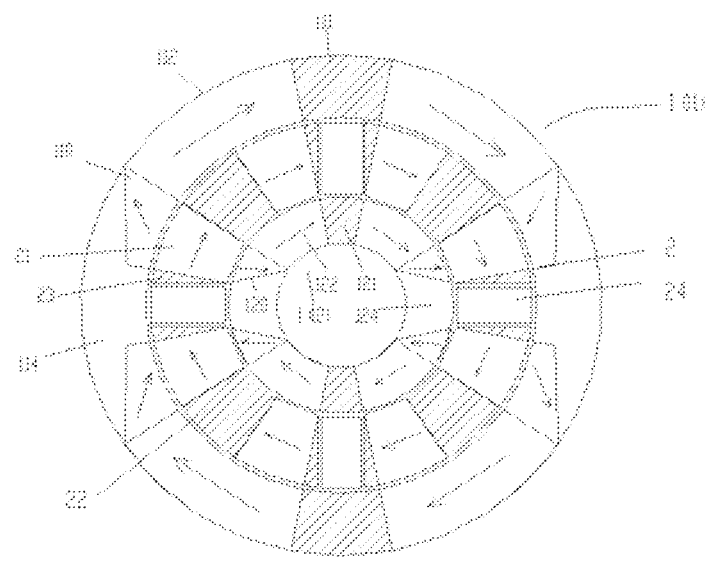
FIG. 8 illustrates a top view of the second implementation mode of the magnetic refrigeration device of the present disclosure.
Figure 9:
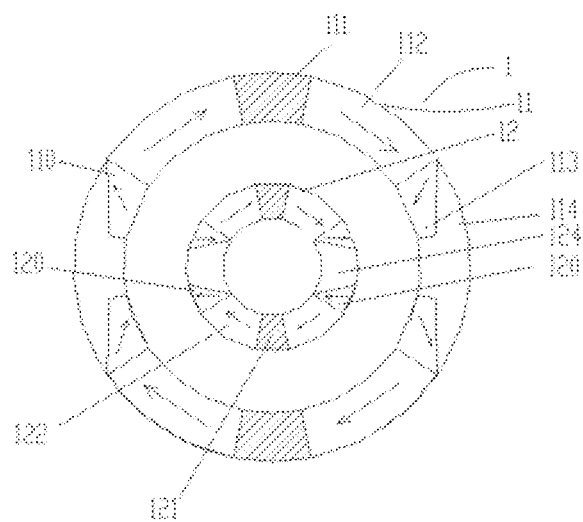
FIG. 9 illustrates a structure schematic diagram of the first magnet assembly in the second implementation mode of the magnetic refrigeration device of the present disclosure.

FIG. 8-9 shows the second implementation mode. The difference between this implementation mode and the first implementation mode lies in the first magnet assembly. FIG. 8 shows the second implementation mode.

A schematic diagram of the first magnet assembly in the second implementation mode is shown in FIG. 9, and the first magnet assembly in the first implementation mode is shown in FIG. 3. The difference between FIG. 3 and FIG. 9 is that a non-magnetic inner connecting piece 124 and a non-magnetic outer connecting piece 114 are added in FIG. 9.

Third Implementation Mode

Figure 10:
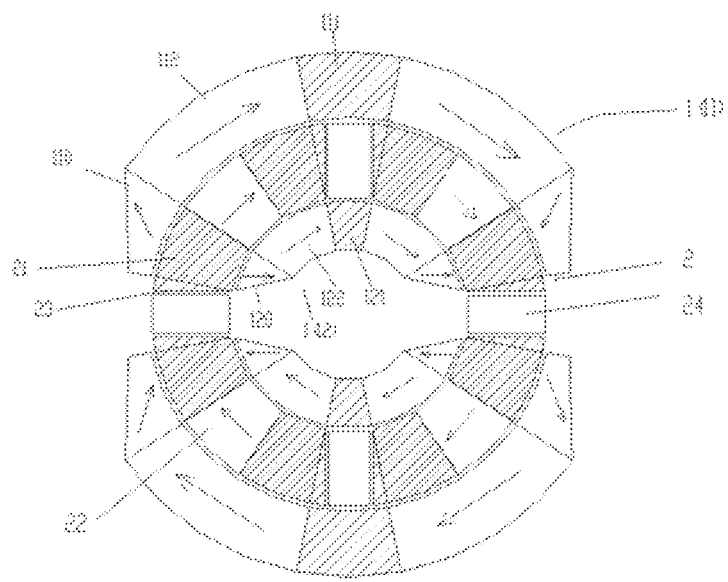
FIG. 10 illustrates a top view of the third implementation mode of the magnetic refrigeration device of the present disclosure.
Figure 11:
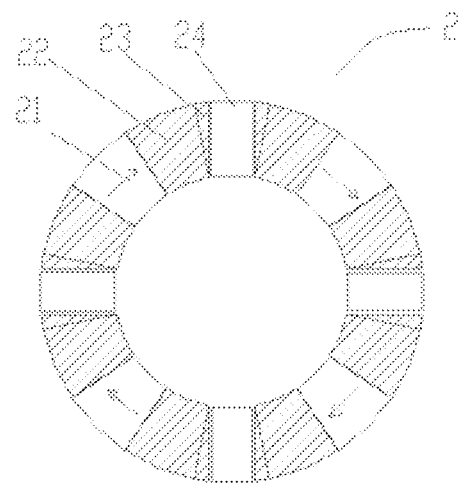
FIG. 11 illustrates a structure schematic diagram of the second magnet assembly in the third implementation mode of the magnetic refrigeration device of the present disclosure.

FIGS. 10-11 are used to describe the third implementation mode. The difference between the third implementation mode shown in FIG. 10 and the first implementation mode shown in FIG. 1 lies in the second magnet assembly.

The difference between the second magnet assembly of the third implementation mode shown in FIG. 11 and the second magnet assembly of the first implementation mode shown in FIG. 4 is that each second magnet assembly unit in FIG. 11 includes two second soft magnets 22 and a second permanent magnet 21 located between them and pole shoes 23 at both ends thereof, an entire second magnet assembly uses a total of four second permanent magnets 21, and in FIG. 4, eight second permanent magnets 21 are used. The use of the soft magnet instead of the permanent magnet reduces the cost of the magnet system. In addition, the use of the soft magnetic materials on both sides of the magnetic working medium bed is beneficial to the convergence of the magnetic circuits, and it is also beneficial to the better magnetic shielding effect of the upper and lower demagnetized magnetic working medium beds shown in FIG. 10-11 during demagnetization, and beneficial to achieving the better demagnetization effect, or the weak magnetic field formed is closer to 0T, and this way has a relatively small effect on a weakening of the magnetic field strength. This is the purpose and advantage of using the soft magnet. In the third implementation mode, the second soft magnet 22 of the second magnet assembly unit may be integrated with the pole shoe 23.

Fourth Implementation Mode

Figure 12:
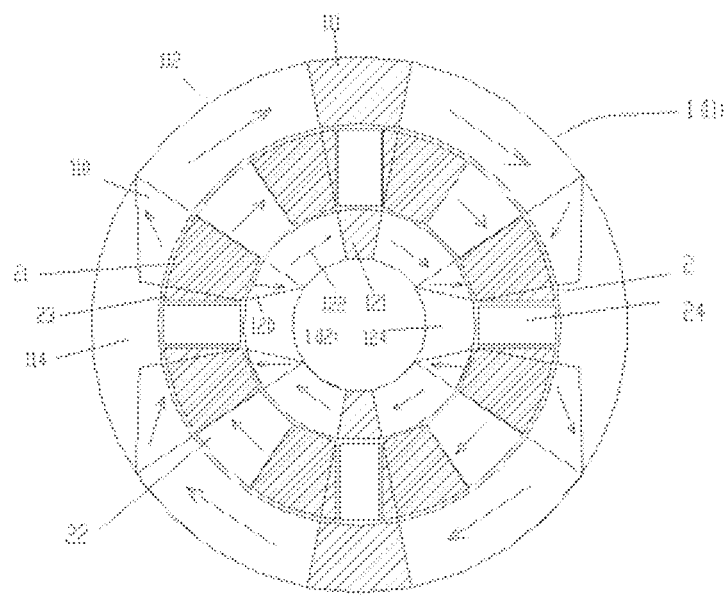
FIG. 12 illustrates a plan view of the fourth implementation mode of the magnetic refrigeration device of the present disclosure.

FIG. 12 is used to describe the fourth implementation mode, and this implementation mode is a combination of the first assembly 1 in the second implementation mode and the second assembly 2 in the third implementation mode.

Figure 13:
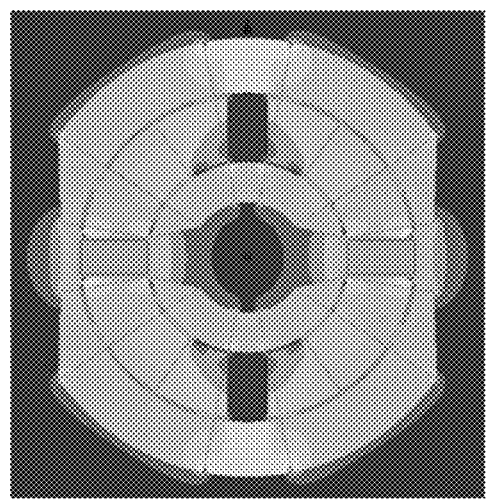
FIG. 13 illustrates a magnetic field cloud diagram generated by the third and fourth implementation modes of the magnetic refrigeration device of the present disclosure.

FIG. 13 shows magnetic field strength cloud diagrams generated by the third implementation mode and the fourth implementation mode, herein the darker color indicates the weaker magnetic field strength, and the lighter color indicates the stronger magnetic field strength. It may be seen from the comparison between FIG. 13 and FIG. 6 that the weaker magnetic field generated in the third and fourth implementation modes is better than that in the first and second implementation modes. It may be seen that compared to FIG. 6, areas of the upper and lower magnetic working medium beds 24 are darker in FIG. 13, it is indicated that the magnetic field is close to 0T. In the magnetic refrigerator, in order to achieve a periodic switching of the magnetization and demagnetization effects, the magnetic field strength is closer to 0T during the demagnetization, it is better. Therefore, the third and fourth implementation modes are better than the first and second implementation modes.

Figure 14:
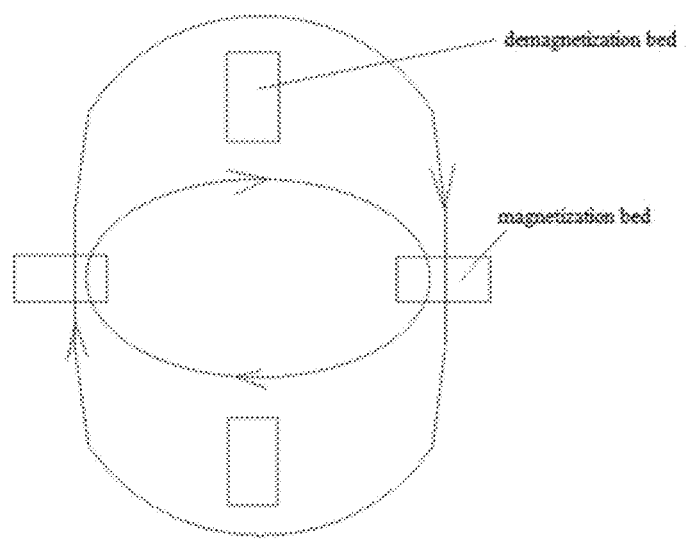
FIG. 14 illustrates a magnetic circuit distribution diagram while the number of air gaps of the magnetic refrigeration device of the present disclosure is 4.
Figure 15:
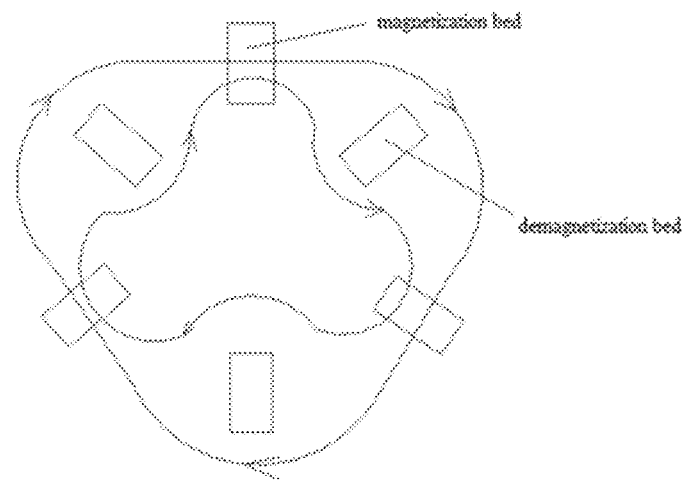
FIG. 15 illustrates a magnetic circuit distribution diagram while the number of air gaps of the magnetic refrigeration device of the present disclosure is 6.
Figure 19:
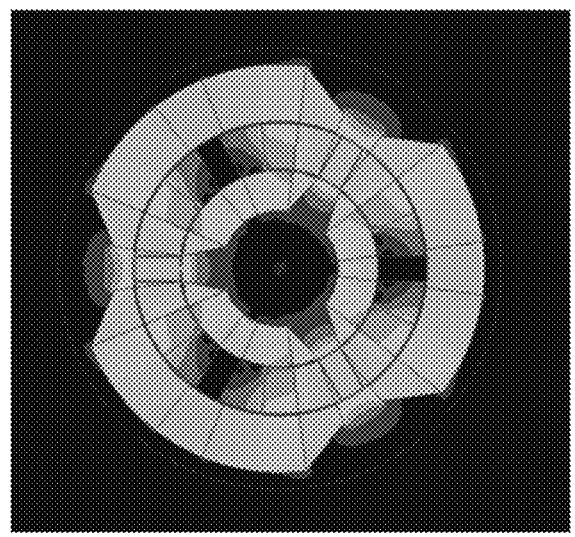
FIG. 19 illustrates a magnetic field cloud diagram generated by the fifth implementation mode of the magnetic refrigeration device of the present disclosure.

Fifth implementation mode The first to fourth implementation modes all belong to the case of 4 magnetic gaps and 4 magnetic working medium beds 24, and the main magnetic circuit thereof is shown in FIG. 14. According to the embodiments of the present disclosure, as shown in FIG. 15, 6 magnetic working medium beds are magnetized and demagnetized, as to form the fifth implementation mode, as shown in FIG. 17-19.

Figures 17, 18:
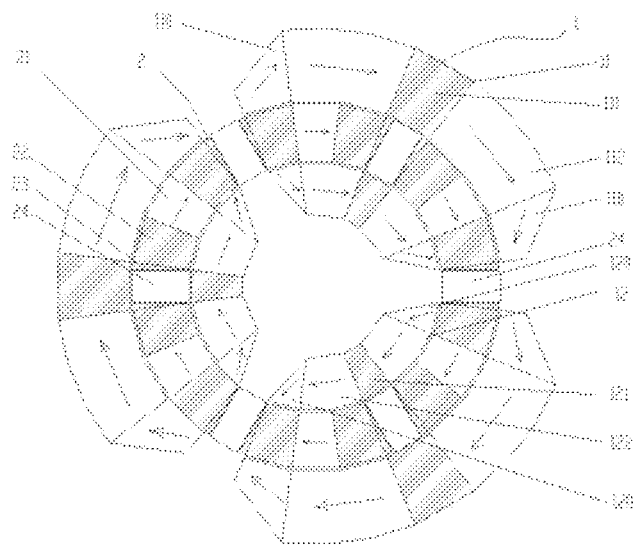
FIG. 17 illustrates a top view of the fifth implementation mode of the magnetic refrigeration device of the present disclosure.
FIG. 18 illustrates a three-dimensional schematic diagram of the fifth implementation mode of the magnetic refrigeration device of the present disclosure.

As shown in FIG. 17, this implementation mode is similar to the third implementation mode, two magnet assemblies are used: the first assembly 1 and the second assembly 2. There are 6 magnetic working medium beds 24 in total. Because the magnetic working medium belongs to a ferromagnetic material, although the material has a certain magnetic conductive effect, the more number of the magnetic working medium beds may not help the magnetic field enhancement too much, but the purpose of increasing the number of the magnetic working medium beds here is to increase an utilization rate of the magnet, that is to say that the more magnetic working medium materials are placed, the greater refrigeration effect is achieved. In theory, in the case that an effective space of the air gap of the magnet system is larger, the number of the loaded magnetic working mediums or the magnetic working medium beds is larger, it is better.

The first magnet assembly includes 3 first magnet assembly units, and in some embodiments, the 3 first magnet assembly units are evenly arranged at 360°. The first magnet assembly unit includes an inner magnet assembly 12 and an outer magnet assembly 11, herein a relative position of the inner magnet assembly 12 and the outer magnet assembly 11 are fixed. In some embodiments, the inner magnet assembly 12 includes a permanent magnet material and a soft magnetic material, and the outer magnet assembly 11 also includes the permanent magnet material and the soft magnetic material. As shown in FIG. 17, a part with an arrow is the permanent magnet material, a direction of the arrow thereof indicates the magnetization direction, and a shaded part is the soft magnetic material. Herein the permanent magnetic material includes but is not limited to neodymium iron boron, and the soft magnetic material may be electrical pure iron, low carbon steel and the like.

The outer magnet assembly 11 includes an outer end permanent magnet 110, a first outer permanent magnet 112, and a first outer soft magnet 111, herein the outer soft magnet 111 is arranged between the two first outer permanent magnets 112, and the outer end permanent magnets 110 are respectively arranged at two ends of the two first outer permanent magnets 112. Similarly, the inner magnet assembly 12 includes two first inner permanent magnets 122, a first inner soft magnet 121 located between them, and inner end permanent magnets 120 located at both ends thereof. The magnetization directions of the permanent magnets in the inner and outer magnet assemblies are the same, so that the formed inner and outer magnetic circuits are kept in the same clockwise direction or the same counterclockwise direction, thereby the magnetic circuit direction of the first magnet assembly unit is constituted, and a magnetic circuit direction of each first magnet assembly unit is also kept in the same clockwise or counterclockwise direction, so that the two first magnet assembly units form an important constituent part of an annular magnetic circuit in the clockwise or counterclockwise direction.

The second magnet assembly includes 6 second magnet assembly units, and the 6 second magnet assembly units are evenly arranged at 360°. In some embodiments, the second magnet assembly unit includes a permanent magnet material and a soft magnetic material, and pole shoes 23 made of the soft magnetic material are arranged at both ends of the second magnet assembly unit. As shown in FIG. 4, each second magnet assembly unit is composed of two second permanent magnets 21, a second soft magnet 22 located between the two second permanent magnets 21 and pole shoes 23 at both ends thereof.

The magnetization direction of the second permanent magnets 21 in the second magnet assembly unit are kept in the same clockwise or counterclockwise direction, thereby the magnetic circuit direction of the second magnet assembly unit is constituted, and the magnetic circuit direction of each second magnet assembly unit is kept in the same clockwise or counterclockwise direction, so that the 6 second magnet assembly units form an important constituent part of the annular magnetic circuit in the clockwise or counterclockwise direction. The 6 second magnet assemblies form 6 gaps between each other, the gap constitutes an air gap volume, and one magnetic working medium bed 24 is arranged in each air gap volume. While the second assembly 2 is rotated, the magnetic working medium bed 24 is rotated synchronously with it. While the second magnet assembly is fixed, the magnetic working medium bed 24 is also fixed, that is to say, the relative position of the magnetic working medium bed 24 and the second magnet assembly remains unchanged.

The first assembly 1 and the second assembly 2 are arranged coaxially, and a circumferential angle occupied by each first magnet assembly unit is twice that of the second magnet unit.

In addition, the size of the second magnet assembly satisfies that its rotational movement area is located between rotational movement areas of the inner magnet assembly 11 and the outer magnet assembly 12 in the first magnet assembly; the direction of the annular magnetic circuit formed by the first magnet assembly unit and the direction of the annular magnetic circuit formed by the second magnet assembly are kept in the same clockwise or counterclockwise direction, thereby the superposition of the magnetic circuits is formed.

There are three rotation modes. The first assembly 1 is fixed, and the second assembly 2 is rotated. The first assembly 1 is rotated, and the second assembly 2 is fixed. Both assemblies are rotated but at different speeds. That is to say, it only needs to form a relative rotational movement of the first magnet assembly and the second magnet assembly.

While the first assembly 1 and the second assembly 2 are rotated relative to each other, the 6 magnetic working medium beds 24 are magnetized and demagnetized correspondingly in a specific time period, herein while the 3 magnetic working medium beds 24 are in the magnetized state, the other 3 magnetic working medium beds 24 are in the demagnetized state, and the states of the adjacent magnetic working medium beds 24 are opposite.

FIG. 18 is a three-dimensional schematic diagram of the fifth implementation mode. FIG. 19 shows a magnetic field cloud diagram formed by the fifth implementation mode. It may be seen that a rectangular air gap between the second magnet assembly units has 3 demagnetization areas (parts with the darkest color) and 3 magnetization areas (parts with the shallow color), as to achieve the periodic magnetization and demagnetization of the 6 magnetic working medium beds 24.

Figure 16:
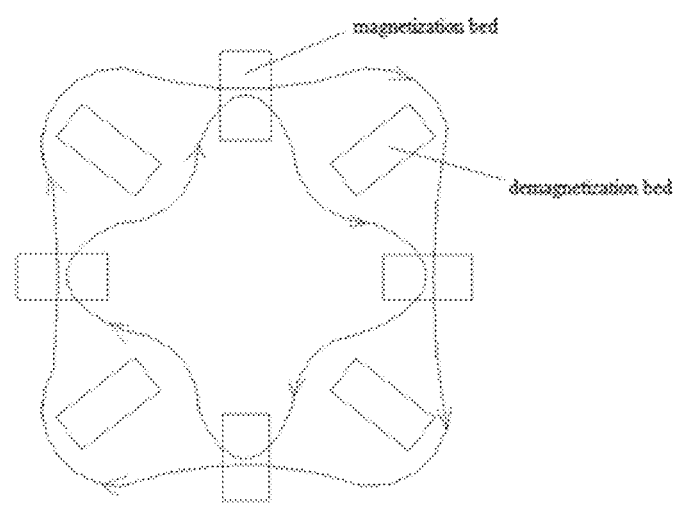
FIG. 16 illustrates a magnetic circuit distribution diagram while the number of air gaps of the magnetic refrigeration device of the present disclosure is 8.

As shown in FIG. 14-16, according to the principle and method of the magnetic circuit of the present disclosure, as shown in FIG. 16, the magnetization and demagnetization of 8 magnetic working medium beds are realized. According to the method of n=6 air gaps in the fifth implementation mode, the magnetization and demagnetization of n air gaps may be realized through the cooperation of m (m=n/2) first magnet assembly units and n second magnet assembly units, herein n=4, 6, 8, 10, 12 . . . . Theoretically, in the case that the effective space of the air gap of the magnet system is larger, the number of the loaded magnetic working mediums or the magnetic working medium beds is larger, it is better, but in reality, if the number of the magnetic working medium beds is larger, a system piping connected thereof is more complicated, so that a reliability of the magnetic refrigerator is reduced.

The specific implementation modes of the first magnet assembly and the second magnet assembly in the above embodiments may not completely cover the method mentioned in the idea of the present disclosure, because there may be a plurality of magnet assemblies. Therefore, as long as it satisfies that the rotating magnetic field system of the present disclosure is divided into at least two layers according to the radius. Specifically, the system may be divided into a first magnet assembly and a second magnet assembly with relative motion, herein the second magnet assembly may be regarded as one layer, and it forms an annular basic magnetic circuit in the clockwise direction. Herein the first magnet assembly radially surrounds an inner and outer parts of the second magnet assembly to form an inner magnet assembly and an outer magnet assembly respectively. The inner and outer magnet assemblies each include at least one layer, and the entire first magnet assembly at least includes one of the inner magnet assembly and the outer magnet assembly. The so-called two-layer is the special case of the smallest layer: the first magnet assembly includes only a single-layer inner magnet assembly or only a single-layer outer magnet assembly. The above number of the layers mainly refers to the radial direction (radius size) to distinguish. Each layer contains at least two small magnet blocks in different magnetization directions and the soft magnetic material to form the closed-loop magnetic circuit. A plurality of the basic magnetic circuits formed by a plurality of the layers may be converged in a plurality of the strong magnetic fields and avoid a plurality of the weak magnetic fields. Finally, the annular magnetic circuit is formed in the same clockwise direction, and the ideas of achieving the periodic magnetization and demagnetization of a plurality of the areas during the relative rotational movement of the magnet assemblies all fall within a scope of protection of the present disclosure.

It should be noted that in this article, relational terms such as "first" and "second" are only used to distinguish one entity or operation from another entity or operation, and do not necessarily require or imply that there is any such actual relationship or sequence between these entities or operations.

The technical features of the above embodiments may be combined arbitrarily. In order to make the description concise, all possible combinations of the various technical features in the above embodiments are not described. However, as long as there is no contradiction in the combinations of these technical features, all should be considered as a scope recorded in the description.

The above embodiments only express several implementation modes of the present disclosure, and descriptions thereof are relatively specific and detailed, but it should not be interpreted as the limitation to a scope of the patent disclosure. It should be pointed out that for those of ordinary skill in the art, without departing from the concept of the present disclosure, a plurality of modifications and improvements may be made, and these all fall within the scope of protection of the present disclosure. Therefore, the scope of protection of the patent in the present disclosure shall be subject to the appended claims.

What is claimed is:

1. A magnetic refrigeration device, comprising:
a first assembly; and
a second assembly, wherein the second assembly is an annular assembly, the first assembly is located on a radial outer side or a radial inner side of the second assembly, the first assembly is a first magnet assembly, the second assembly is provided with an air gap space capable of accommodating a magnetic working medium bed in a circumferential direction, the second assembly is provided with a plurality of annular segments arranged at intervals in the circumferential direction, and the air gap space is arranged between adjacent annular segments of the plurality of annular segments; the first assembly is configured to rotate relative to the second assembly, and directions of a magnetic line of force of the first magnet assembly are distributed in a circumferential direction of the annular second assembly;
wherein the first assembly comprises an outer magnet assembly located on the radial outer side of the second assembly and an inner magnet assembly located on the radial inner side of the second assembly; the outer magnet assembly further comprises at least one first outer permanent magnet, at least one first outer soft magnet, and the first outer soft magnet is arranged between two adjacent first outer permanent magnets.

2. The magnetic refrigeration device according to claim 1, wherein
the second assembly is also a second magnet assembly, and directions of a magnetic line of force of the second assembly are also distributed along the circumferential direction of the annular second assembly.

3. The magnetic refrigeration device according to claim 2, wherein
magnetic lines of force of the second magnet assembly are serially connected to form a closed loop.

4. The magnetic refrigeration device according to claim 1, wherein the outer magnet assembly and the inner magnet assembly correspond to each other and occupy a same angle in the circumferential direction.

5. The magnetic refrigeration device according to claim 4, wherein:
the outer magnet assembly comprises a first unit and a second unit that are separated, and a magnetic line of force of the first unit and a magnetic line of force of the second unit are serially connected through the second assembly to form a closed loop of the magnetic lines of force.

6. The magnetic refrigeration device according to claim 5, wherein:
while the outer magnet assembly comprises a first unit and a second unit that are separated, the first unit and the second unit are connected by a non-magnetic outer connecting piece.

7. The magnetic refrigeration device according to claim 4, wherein:
the inner magnet assembly comprises a third unit and a fourth unit that are separated, and a magnetic line of force of the third unit and a magnetic line of force of the fourth unit are serially connected through the second assembly to form a closed loop of the magnetic lines of force.

8. The magnetic refrigeration device according to claim 7, wherein:
while the inner magnet assembly comprises the third unit and the fourth unit that are separated, the third unit and the fourth unit are connected by a non-magnetic inner connecting piece.

9. The magnetic refrigeration device according to claim 1, wherein:
while the second assembly is also the second magnet assembly, directions of magnetic lines of force of the second assembly, directions of magnetic lines of force of the inner magnet assembly and directions of magnetic lines of force of the outer magnet assembly are all in a same surrounding direction.

10. The magnetic refrigeration device according to claim 1, wherein:
an edge of the first outer permanent magnet is also connected and provided with an outer end permanent magnet, and directions of magnetic lines of force of the outer end permanent magnet point to the magnetic working medium bed or extension lines of magnetic lines of force of the outer end permanent magnet pass through the magnetic working medium bed.

11. The magnetic refrigeration device according to claim 1, wherein:
the inner magnet assembly further comprises at least one first inner permanent magnet and at least one first inner soft magnet, and the first inner soft magnet is arranged between two adjacent first inner permanent magnets.

12. The magnetic refrigeration device according to claim 11, wherein:
an edge of the first inner permanent magnet is also connected and provided with an inner end permanent magnet, and directions of magnetic lines of force of the inner end permanent magnet point to the magnetic working medium bed or directions of extension lines of the magnetic lines of force of the inner end permanent magnet pass through the magnetic working medium bed.

13. The magnetic refrigeration device according to claim 2, wherein:
the second assembly further comprises a second permanent magnet and a second soft magnet, the second soft magnet is arranged between two adjacent second permanent magnets, a pole shoe is also arranged between the second permanent magnet and the magnetic working medium bed, and the pole shoe is made of a soft magnetic material.

14. The magnetic refrigeration device according to claim 2, wherein:
the second assembly further comprises a second permanent magnet and a second soft magnet, and the second permanent magnet is arranged between two adjacent second soft magnets, a pole shoe is also arranged between the second soft magnet and the magnetic working medium bed, and the pole shoe is made of a soft magnetic material.

15. The magnetic refrigeration device according to claim 14, wherein:
the pole shoe and the second soft magnet are an integrally formed structure.

16. The magnetic refrigeration device according to claim 1, wherein:
there are more than two magnetic working medium beds, the air gap space is a magnetic gap, and more than one magnetic working medium bed is placed in one magnetic gap.

17. The magnetic refrigeration device according to claim 16, wherein:
there are 4 magnetic working medium beds and 4 magnetic gaps; or there are 6 magnetic working medium beds and 6 magnetic gaps.

* * * * *